US006612322B2

(12) United States Patent
Becker

(10) Patent No.: US 6,612,322 B2
(45) Date of Patent: Sep. 2, 2003

(54) METHOD OF DETECTING VALVE TIMING

(75) Inventor: Joerg C. Becker, Auburn Hills, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 28 days.

(21) Appl. No.: 09/924,086

(22) Filed: Aug. 7, 2001

(65) Prior Publication Data

US 2002/0017325 A1 Feb. 14, 2002

Related U.S. Application Data

(60) Provisional application No. 60/223,946, filed on Aug. 9, 2000.

(51) Int. Cl.$^7$ ................................................ F16K 37/00

(52) U.S. Cl. .................. 137/1; 251/129.1; 251/129.15; 137/554

(58) Field of Search ................ 137/554, 1; 251/129.09, 251/129.1, 129.15

(56) References Cited

U.S. PATENT DOCUMENTS 3,456,132 A * 7/1969 Dechelotte .................. 307/296
3,789,876 A * 2/1974 Kempton et al. ........... 137/554
4,004,258 A * 1/1977 Arnold ........................ 335/17
4,690,371 A 9/1987 Bosley et al.
4,856,482 A 8/1989 Linder et al.
5,101,856 A * 4/1992 Kakinuma et al. .......... 137/554
5,316,873 A 5/1994 Scrivano
5,552,240 A 9/1996 Derstine
5,677,079 A 10/1997 DeZorzi
5,805,423 A 9/1998 Wever et al.
5,922,489 A 7/1999 Adachi
6,026,771 A 2/2000 Escobosa
6,124,056 A 9/2000 Kimura
6,191,929 B1 2/2001 Hoffmann et al.

FOREIGN PATENT DOCUMENTS

DE 4438059 A1 10/1994
DE 10019454 A1 4/2000
EP 0810350 A1 12/1997
JP 2000008894 1/2000

* cited by examiner

*Primary Examiner*—A. Michael Chambers

(57) ABSTRACT

A method and apparatus for detecting a valve position includes the step of providing a non-actuating alternating current signal (24) to a drive coil signal (22). As a valve plunger (14) moves within the coil, the non-actuating signal changes. By monitoring (26,29) the non-actuating signal a control can predict when the plunger reaches a particular position. This invention thus provides a simplified way of detecting an end of travel position (FIG. 1).

18 Claims, 1 Drawing Sheet

METHOD OF DETECTING VALVE TIMING

This application claims priority to Provisional Patent Application Ser. No. 60/223,946 filed Aug. 9, 2000.

BACKGROUND OF THE INVENTION

This application relates to a method for detecting valve position in a valve driven by at least one electromagnetic coil, wherein changes in a signal applied to the coil are sensed.

For purposes of this application, the term "coil" will refer to any type of device such as a solenoid, etc., which receives an electric signal to in turn move a plunger. The plunger may be a permanent magnet, or simply a material such as iron which is subject to magnetic attraction.

Valves are typically utilized in vehicle engines to control the supply of fuel and air to the engine cylinders. One type of valve is driven by a pair of coils, and is utilized as part of a fuel injector. In such a valve the two coils are selectively and alternatively powered to drive the plunger between two positions and control the supply of fuel. With such systems, it is very difficult to accurately track the timing of the valve, and to determine its position as it moves.

Other types of valves are driven by a single coil in one direction, and moved in the other direction by a spring force. The same concerns with regard to tracking the movement of the plunger exists in these systems.

Another application for vehicle control is the air supply and exhaust valves on an engine. Historically these valves have been controlled to open in sequence by a cam shaft and rocker arms. More recently camless control systems have been utilized. However, these camless systems have the same problem as mentioned above with regard to detection of the actual position of the valve plunger.

The present invention provides a simple method for detecting plunger position.

SUMMARY OF THE INVENTION

In a disclosed method and apparatus of this invention, two signals are supplied to a coil for driving a valve plunger. A first actuating signal powers the coil to drive the plunger. A second non-actuating signal is applied to at least one coil associated with the plunger. As the plunger moves, it will produce changes in this non-actuating signal. These changes are identified by a control such that by monitoring the changes the system will be able to predict at least when the plunger has approached an end of travel position. Most preferably, the change is compared to a reference signal.

In one embodiment there is only one coil for powering the plunger. In a second embodiment there are a pair of spaced coils. In this embodiment the non-actuating signal could be applied to the activated coil, or the deactivated coil.

In the embodiment having two drive coils, it could be the non-actuated coil which is utilized to provide the reference. In particular, a valve plunger other than the one that is being driven may also have a non-actuating signal applied to one of its coils. The changes in that signal are compared to the changes in the signal from the moving plunger coil. In this way, the system is better able to accurately track when changes in the non-actuating signal are in fact indicative of an end of travel position.

These and other features of the present invention can be best understood from the following specification and drawings, and the following which is a brief description.

DETAILED DESCRIPTION OF THE PREFERRED EMBODIMENT

Figure 1:
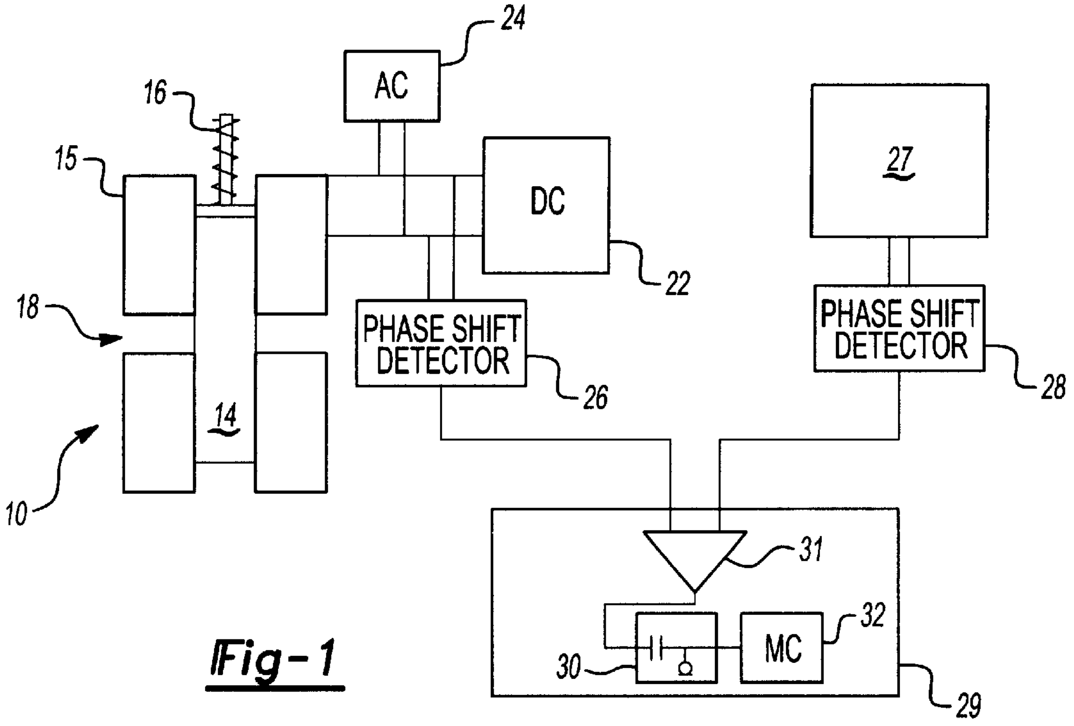
FIG. 1 shows a first embodiment of the invention.

As shown in FIG. 1, valve 10 including a plunger 14 which is spring biased by a spring 16 to a position where it blocks flow through a fluid path 18. A coil 15 is selectively actuated to pull the plunger in an opposed direction. As illustrated, a DC actuating circuit 22 and an AC supply circuit, such as an oscillator, 24, apply both an actuating (DC) and a non-actuating (AC) signal to the coil 15. A phase shift detector 26 detects any change in the phase supplied by the AC source 24, which may be modified by the movement of the plunger 14. A second signal is taken from a second reference source 27, which could be a plunger which is non-actuated. As an example, these systems are typically employed in internal combustion engines having a number of cylinders, and there are typically several of the plungers which would be non-actuated. Reference signal source 27 may be taken from one of those non-actuated plungers. The signals from both a non-actuated system phase shift detector 28 and phase shift detector 26 associated with the activated system are both supplied to a control 29. In the disclosed embodiment, the control 29 has differentiating applier 31, a differentiator 30 and in turn to a microprocessor control 32. The control is shown as partially hardware, but of course all of these steps can also be taken in software within the scope of this invention. Essentially, the system compares the change in phase shift between the two phase shift detectors, and if a significant difference exists, then a determination can be made that the plunger is at a particular position.

Applicant has learned that when movement of the plunger begins or when it approaches an end of travel position, there are distinct changes in the super imposed AC signal that the detectors from the two coils will be able to detect. As the plunger moves, the phase will change, and the phase shift detector will detect those changes. Alternatively, the amplitude or frequency could also be monitored for change. By monitoring these changes as the plunger is moved, the inventor of this system has learned it can identify particular points during the movement path of the plunger.

By utilizing the reference plunger 27 which is non-actuated, the system is able to eliminate "noise" or other false indications of a particular point in travel, that could have been erroneously based upon a change in the signal for some reason other than plunger position. As an example, vibration, or other variables that will be experienced by the vehicle could also result in a phase shift. By looking at the non-actuated plunger, the system is able to filter out any such false readings. That is, if the non-actuated plunger is undergoing a similar phase shift to the one in the plunger being monitored, then the control will be able to identify that it is not an end of travel position but instead some other variable which has caused the phase shift.

Figure 2:
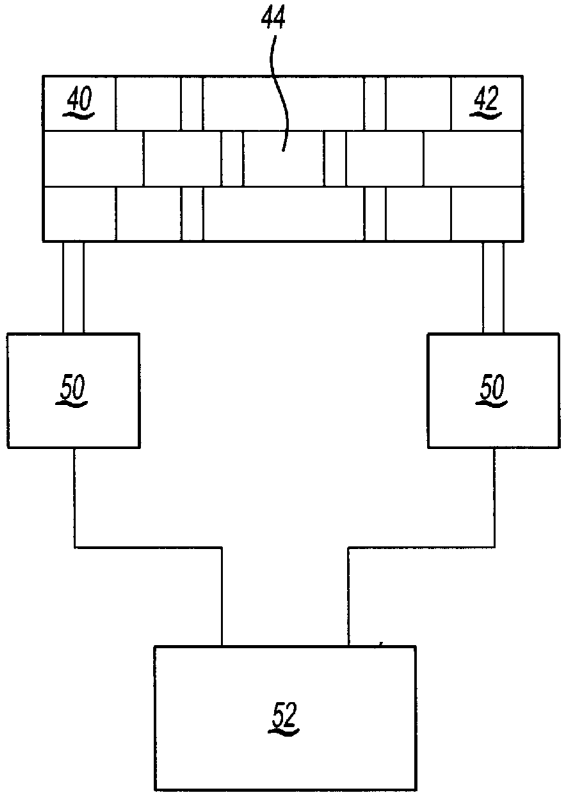
FIG. 2 shows another embodiment of the invention.

As shown in FIG. 2, another common type plunger has two drive coils rather than a spring. The drive coils 40 and 42 are selectively actuated to move the plunger 44 between two positions. Each of the two coils is provided with its own drive circuit 50, and those two circuits send signals from phase shift detectors to a control 52. The circuit 50 and control 52 may be generally as shown in FIG. 1. This two-coil system could also be monitored by taking a reference from another non-actuated plunger.

Moreover, it may be that a certain expected phase shift for a particular point in the plunger movement could be stored in a control, rather than requiring comparison with a reference. However, it is preferred that the reference signal be utilized. Finally, while the non-actuated signal is preferably applied to the coil which is actuated, it may also be applied to the non-actuated coil, and it would be expected that some change would occur even in the non-actuated coil as the plunger moves.

The aforementioned description is exemplary rather then limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A method of detecting valve movement comprising the steps of:

a) actuating a first coil through a first actuating signal to drive a first plunger to move a first valve;

b) imposing a first non-actuating signal on the first coil;

c) detecting the first non-actuating signal as the first plunger moves;

d) imposing a second non-actuating signal on a second coil in communication with a second plunger;

e) comparing the first non-actuating signal with the second non-actuating signal; and f) determining a position of the first plunger based upon a difference between the first non-actuating signal and the second non-actuating signal.

2. The method of claim 1 wherein the first and second non-actuating signals comprise an alternating current and the first actuating signal comprises a direct current.

3. The method of claim 1 wherein the second plunger has a static position when the first non-actuating signal is compared with the second non-actuating signal.

4. The method of claim 3 wherein the second plunger is unactuated.

5. The method of claim 1 wherein the difference relates to an amplitude difference between the first non-actuating signal and the second non-actuating signal.

6. The method of claim 1 wherein the difference relates to a frequency difference between the first non-actuating signal and the second non-actuating signal.

7. The method of claim 1 wherein the difference relates to a phase difference between the first non-actuating signal and the second non-actuating signal.

8. A method of controlling a valve including the steps of:

a) providing a first coil for driving a first plunger in a first direction;

b) providing a second coil for driving the first plunger in a second direction;

c) providing a control for alternatively supplying an actuating signal to each of the first and second coils to drive the first plunger in opposed directions;

d) imposing a first alternating current non-actuating signal on one of the first and second coils;

e) imposing an actuating signal on one of the first and second coils;

f) detecting the first alternating current non-acuating signal as the first plunger moves;

g) imposing a second alternating current non-actuating signal on a third coil in communication with a second plunger;

h) comparing the first alternating current non-actuating signal with the second alternating current non-actuating signal; and i) determining a position of the first plunger based upon a difference between the first alternating current non-actuating signal and the second alternating non-actuating signal.

9. The method of claim 8 wherein the first alternating current non-actuating signal is supplied one of the first coil and the second coil that also receives the actuating signal.

10. The method of claim 8 wherein the first alternating current non-actuating signal is supplied to one of the first coil and the second coil that does not receive the actuating signal.

11. The method of claim 8 wherein the second plunger has a static position when the first alternating current non-actuating signal is compared with the second alternating current non-actuating signal.

12. The method of claim 11 wherein the second plunger is unactuated.

13. The method of claim 8 wherein the difference relates to an amplitude difference between the first alternating current non-actuating signal and the second alternating current non-actuating signal.

14. The method of claim 8 wherein the difference relates to a frequency difference between the first alternating current non-actuating signal and the second alternating current non-actuating signal.

15. The method of claim 8 wherein the difference relates to a phase difference between the first alternating current non-actuating signal and the second alternating current non-actuating signal.

16. A drive system for a valve comprising:

a first plunger connected to move with a valve;

at least a first coil for driving said first plunger in a first direction;

a drive circuit for supplying an actuating signal to said at least first coil;

a first source to supply a first alternating current non-actuating signal to said at least first coil;

a second plunger;

at least a second coil in communication with said second plunger;

a second source to supply a second alternating current non-actuating signal to said at least second coil;

a device for comparing said first alternative current non-actuating signal with said second alternating current non-actuating signal; and a control unit for determining a position of said first plunger based upon a difference between said first alternating current non-actuating signal and said second alternating current non-actuating signal.

17. The valve system of claim 16 wherein said at least first coil comprises a pair of coils that drive said first plunger in opposed directions.

18. The valve system of claim 16 wherein said at least second coil comprises a pair of coils that drive said second plunger in opposed directions.

* * * * *